(12) United States Patent
Hosotani et al.

(10) Patent No.: US 6,370,040 B2
(45) Date of Patent: Apr. 9, 2002

(54) SWITCHING POWER SUPPLY APPARATUS HAVING PLURAL OUTPUTS AND PLURAL OUTPUT VOLTAGE DETECTION

(75) Inventors: Tatsuya Hosotani; Hiroshi Takemura, both of Muko; Takahiro Minagawa, Nagaokakyo, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/792,768

(22) Filed: Feb. 23, 2001

(30) Foreign Application Priority Data

Feb. 25, 2000 (JP) .......................................... 12-049509

(51) Int. Cl.$^7$ .......................................... H02M 3/335
(52) U.S. Cl. .......................................... 363/19; 363/97
(58) Field of Search .............................. 363/18, 19, 97

(56) References Cited

U.S. PATENT DOCUMENTS

| | | | | |
|---|---|---|---|---|
| 4,400,767 A | * | 8/1983 | Fenter ........................... | 363/21 |
| 4,680,688 A | * | 7/1987 | Inou et al. ..................... | 363/21 |
| 5,383,106 A | * | 1/1995 | Yoshida et al. ................ | 363/18 |
| 5,812,383 A | * | 9/1998 | Majid et al. ................... | 363/19 |
| 5,995,384 A | * | 11/1999 | Majid et al. ................... | 363/21 |
| 6,061,252 A | | 5/2000 | Hosotani ....................... | 363/16 |
| 6,201,713 B1 | * | 3/2001 | Hosotani ....................... | 363/19 |

* cited by examiner

*Primary Examiner*—Jeffrey Sterrett
(74) *Attorney, Agent, or Firm*—Ostrolenk, Faber, Gerb & Soffen, LLP

(57) ABSTRACT

A switching power supply apparatus comprises a transformer having primary winding and at least two secondary windings, a first switching element connected in series with the primary winding, a control circuit for controlling the output from the first switching element by control of the on-time thereof, a rectification circuit for rectifying at least two outputs from the secondary windings, an output detection circuit for detecting the output voltages and feeding back the output voltages as a control signal for control of the on-time to the control circuit. The output voltage detection circuit comprises a control signal formation section in which the control signal for the on-time is formed, corresponding to a voltage at a voltage comparison terminal, and plural voltage detectors connected between the at least two outputs of the secondary windings and the voltage comparison terminal, respectively.

20 Claims, 8 Drawing Sheets

US 6,370,040 B2

SWITCHING POWER SUPPLY APPARATUS HAVING PLURAL OUTPUTS AND PLURAL OUTPUT VOLTAGE DETECTION

BACKGROUND OF THE INVENTION

1. Field of the Invention

The present invention relates to a switching power supply apparatus in which at least two output voltages are produced by means of one transformer.

2. Description of the Related Art

Generally, in a switching power supply apparatus having the configuration in which two output voltages are obtained by means of one transformer, only one output voltage is detected to control a first switching element connected to the primary of the transformer. FIG. 1 is a circuit diagram of a conventional switching power supply apparatus configured as described above.

A transformer T is provided with a primary winding T1, secondary windings T2 and T3, and a drive winding T4. A switching element Q1 (hereinafter, referred to as a first switching element) is connected in series with the primary winding T1. A control circuit CT controls the on-time of the first switching element Q1. Output from the secondary winding T2 is rectified by a rectification diode Ds1 and smoothed by a capacitor to be output as a first output Vo1. Moreover, output from the other secondary winding T3 is rectified by a rectification diode Ds2 and smoothed by a capacitor to be output as an output Vo2. In this example, the control circuit containing the drive winding T4 of the transformer T controls the on-time of the first switching element Q1, and moreover, causes the first switching element Q1 to oscillate autonomously. With this configuration employed, when the first switching element Q1 is on, an input voltage Vin is applied to the primary winding T1, making input current flow so that energy is stored in the transformer T. Furthermore, when the first switching element Q1 is off, the energy stored in the transformer T is released as output current via the secondary windings T2 and T3. Thus, the device is configured as an energy storage type switching power supply apparatus.

In the control circuit CT, output voltage from the drive winding T4 is delayed to some degree by a resistor R4 and a capacitor C3 to be applied to the control terminal of the first switching element Q1, and moreover, is applied to a time constant circuit comprising a resistor R1 and a capacitor C1, so that a transistor Tr1 is turned on after a constant time-period, causing the first switching element Q1 to turn off. When the first switching element Q1 turns off, energy stored in the transformer T is released as electric current. When the release of the energy is completed, reverse voltages are applied to the rectification diodes Ds1 and Ds2, respectively. The capacitive impedance, equivalent from the standpoint of these rectification diodes, and the winding inductor of the transformer T resonate, and with voltage generated in the drive winding T4 of the first switching element Q1, voltage is applied to the control terminal of the first switching element Q1, so that the first switching element Q1 turns on again.

Moreover, an output voltage detection circuit DT is provided on the output side of the rectification circuit comprising the rectification diodes Ds1 and Ds2, and capacitors. The output voltage detection circuit DT detects only output voltage with respect to the first output Vo1. That is, the voltage of the first output Vo1 is detected by resistors R2 and R3. The voltage divided by the resistors R2 and R3 is input to a voltage comparison terminal Vr as a comparison voltage. A series circuit comprising a photodiode PD1, a shunt regulator ZD1, and a resistor 5 is connected between Vo1 and GND. The above detection voltage is input to the voltage comparison terminal (reference terminal) Vr of the shunt regulator ZD1. A phototransistor PTr1 arranged in opposition to the photodiode PD1 is connected between the base and collector of the transistor Tr1 in the above-described control circuit CT.

With the above arrangement, when the first output Vo1 is increased, the input voltage to the shunt regulator ZD1 is increased. Then, since the inflow current to the photodiode PD1 is increased, the transistor Tr1 is turned on earlier via the operation of the phototransistor PTr1 in the control circuit CT. As a result, the on-time of the first switching element Q1 becomes shortened, and thereby, the first output voltage Vo1 is reduced. In this way, the output voltage of the first output Vo1 is monitored by the output voltage detection circuit DT, and a control signal corresponding to the detection voltage is formed and fed back to the control circuit CT, whereby the first output voltage Vo1 can be stabilized. Moreover, since the first output Vo1 is stabilized, the second output voltage Vo2 is stabilized to some degree.

However, the above-described conventional switching power supply apparatus shown in FIG. 1 has the problem that, though the output voltage of the first output voltage Vo1 to which the output voltage detection circuit is directly connected can be stabilized with high accuracy, a sufficiently high voltage accuracy can not be obtained for the output voltage Vo2 other than the output voltage Vo1.

To solve this problem, in some cases, a voltage stabilization circuit such as a series regulator circuit or the like is inserted in the second output voltage Vo2 circuit, or a dummy resistor is used. With such circuits, problems are caused such as an increase in number of parts, reduction of circuit efficiency, temperature rise of the power supply apparatus, and so forth.

SUMMARY OF THE INVENTION

Accordingly, it is an object of the present invention to provide a switching power supply apparatus in which, when at least two output voltages are provided, each of the output voltage accuracies can be stabilized at a predetermined control ratio by detecting the respective output voltages.

The switching power supply apparatus of the invention comprises a transformer having a primary winding and at least two secondary windings, a first switching element connected in series with the primary winding, a control circuit for controlling the output from the first switching element by control of the on-time thereof, a rectification circuit for rectifying at least two outputs from the secondary windings, and an output detection circuit for detecting the output voltages, and feeding back the output voltages as a control signal for the on-time to the control circuit, wherein the output voltage detection circuit comprises a control signal formation section in which the control signal for the on-time is formed, corresponding to voltage at a voltage comparison terminal, and plural voltage detectors connected between the at least two outputs of the secondary windings and the voltage comparison terminal, respectively.

In this switching power supply apparatus, output voltages from the respective outputs, generated by at least two secondary windings, are detected by the voltage detectors connected to the outputs, respectively, and are input together to the voltage comparison terminal. The extents of the influences of the variations in the respective outputs onto the voltage comparison terminal will be considered below. The extents of the influences, if resistors are used for the detection, are varied, depending on the resistances. Accordingly, the plural output voltages can be controlled at an optional ratio by designing the resistances of the voltage detection resistors corresponding to their specifications.

In this way, the plural voltage detectors are connected between at least two outputs of the secondary windings and the voltage comparison terminal, and the control signal for the on-time of the first switching element connected to the primary winding is formed, corresponding to voltage at the voltage comparison terminal. Therefore, the respective output voltages can be stabilized at a desired control ratio.

According to an aspect, for the plural voltage detectors, at least one Zener diode is used.

By appropriate selection of the Zener diode, the respective output voltages from the circuit can be stabilized at the above-described desired control ratio only when the output voltage from the circuit connected to the Zener diode exceeds a predetermined voltage. Thus, the output voltages can be suppressed from increasing. Moreover, when the output voltage from the circuit connected to the Zener diode is less than the predetermined voltage, only the output voltage from the circuit not connected to the Zener diode is controlled for stabilization.

According to another aspect, the secondary winding comprises at least two secondary windings, the rectification output terminal of a predetermined secondary winding is connected to one end of the other secondary winding, and current through the other end of the other secondary winding is rectified, and is output.

In this embodiment, no influences are exerted due to of variations in voltage, caused by variations in current flowing in the rectification diode for the predetermined secondary winding. For this reason, correspondingly, the voltage accuracy of the other secondary winding is improved.

According to still another aspect, when the first switching element is on, input voltage is applied to the primary winding, causing current to flow so that energy is stored in the transformer, and when the first switching element is turned off, the energy stored in the transformer is released from the secondary windings.

In this embodiment, the switching power supply apparatus comprises a flyback type. Thus, it is not necessary to provide a choke coil or the like on the secondary side. Accordingly, a switching power supply apparatus having a small size, a high accuracy, and a high stability can be provided.

According to still another aspect, the switching power supply apparatus further comprises an inductor connected in series with the primary winding, and a series circuit comprising a capacitor and a second switching element, connected in parallel to the series circuit comprising the inductor and the primary winding, wherein the control circuit turns the first and second switching elements on and off, alternately, so as to sandwich a time-period when both of the switching elements are off, and controls the on-time of the switching elements, whereby the outputs therefrom are controlled.

Such a switching power supply apparatus in which the primary of the transformer is configured as described above is disclosed in U.S. Pat. No. 6,061,252 and Japanese Unexamined Patent Publication No. 11-187664, both of which are assigned to the assignee of the present invention, and the disclosure of which are hereby incorporated by reference.

In this switching power supply apparatus, when the first switching element turns off, energy stored in the inductor connected in series with the primary winding is released as charging current into the capacitor. Then, directly after this, the second switching element turns on, and discharging is carried out based on the charge potential of the capacitor. With the discharging current, energy is stored in the primary winding of the transformer and the inductor. When the second switching element turns off after a predetermined time-period, the energy stored again in the inductor L flows via the primary winding and the input power source. In this operation, the inductor connected in series with the primary winding includes the leakage inductance of the transformer. Accordingly, generation of surge, caused by the leakage inductance at switching, can be prevented. Moreover, the discharging current, generated when the second switching element Q2 is on, becomes an resonant current. This is reflected by the secondary. That is, the secondary winding current output takes a part of the sinusoidal waveform starting from a zero voltage (mountainous waveform), so that surge in a leading edge can be practically neglected.

Since the current surge or the like is suppressed as described above, the output voltages can be prevented from increasing due to the surge current or the like. As a result, the voltage accuracy of an output produced at a small control ratio or a non-controlled output can be improved. Especially, when said load having a large control ratio is heavy, and the load having a small control ratio is light, conventionally surge current causes the output having a small control ratio to rise in voltage. However, this is considerably improved by this arrangement.

According to still another aspect, the switching power supply apparatus further comprises an inductor connected in series with the primary winding, and a series circuit comprising a capacitor and a second switching element, connected in parallel to the first switching element, wherein the control circuit turns the first and second switching elements on and off, alternately, so as to sandwich a time-period when both of the switching elements are off, and controls the on-time of the switching elements, whereby the outputs therefrom are controlled.

With this structure, the switching power supply apparatus carries out the same operation as expalained above.

According to still another aspect, the leakage inductance of the transformer is used.

In this embodiment, the inductor consists of a leakage inductance itself. This can reduce the number of parts, since it is not necessary to provide the inductor as a separate part.

According to still another aspect, the control circuit comprises a drive winding provided in the transformer to drive the first and second switching elements, respectively, and a control section provided with a time constant circuit for providing on-off signals to the control terminals of the first and second switching elements at a predetermined timing by use of a voltage substantially proportional to the voltage of the primary winding and generated in the drive winding, whereby the first and second switching elements oscillate autonomously.

In this embodiment, the first switching element and the second switching element are autonomously operated. Thus, oscillation IC's or the like are not needed. The number of parts can be significantly reduced. Moreover, the first and second switching elements can be easily turned on and off alternately so as to sandwich a time-period when both of them are off, and the on-time of these switching elements can be simply controlled. The loss and breaking of elements, caused by the short-circuit current which flows when the two switching elements are simultaneously turned on, can be prevented.

According to still another aspect, the control circuit includes a rectification diode, and a capacitive impedance connected in parallel to the rectification diode.

Since the first switching element in the primary operates as a switch, surge-voltage and surge-current are produced in the output of the secondary. The capacitive impedance is connected in parallel to the rectification diode, which enables the voltage surge to be absorbed. Moreover, charges are supplied to the output via the capacitive impedance, so that the affects of the voltage-drop of the rectification diode can be reduced.

According to still another aspect, the rectification circuit includes an inductive impedance connected in series with the rectification diode.

In this embodiment, the inductive impedance is connected in series with the rectification diode, Thus, especially, current surge can be prevented.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 2:
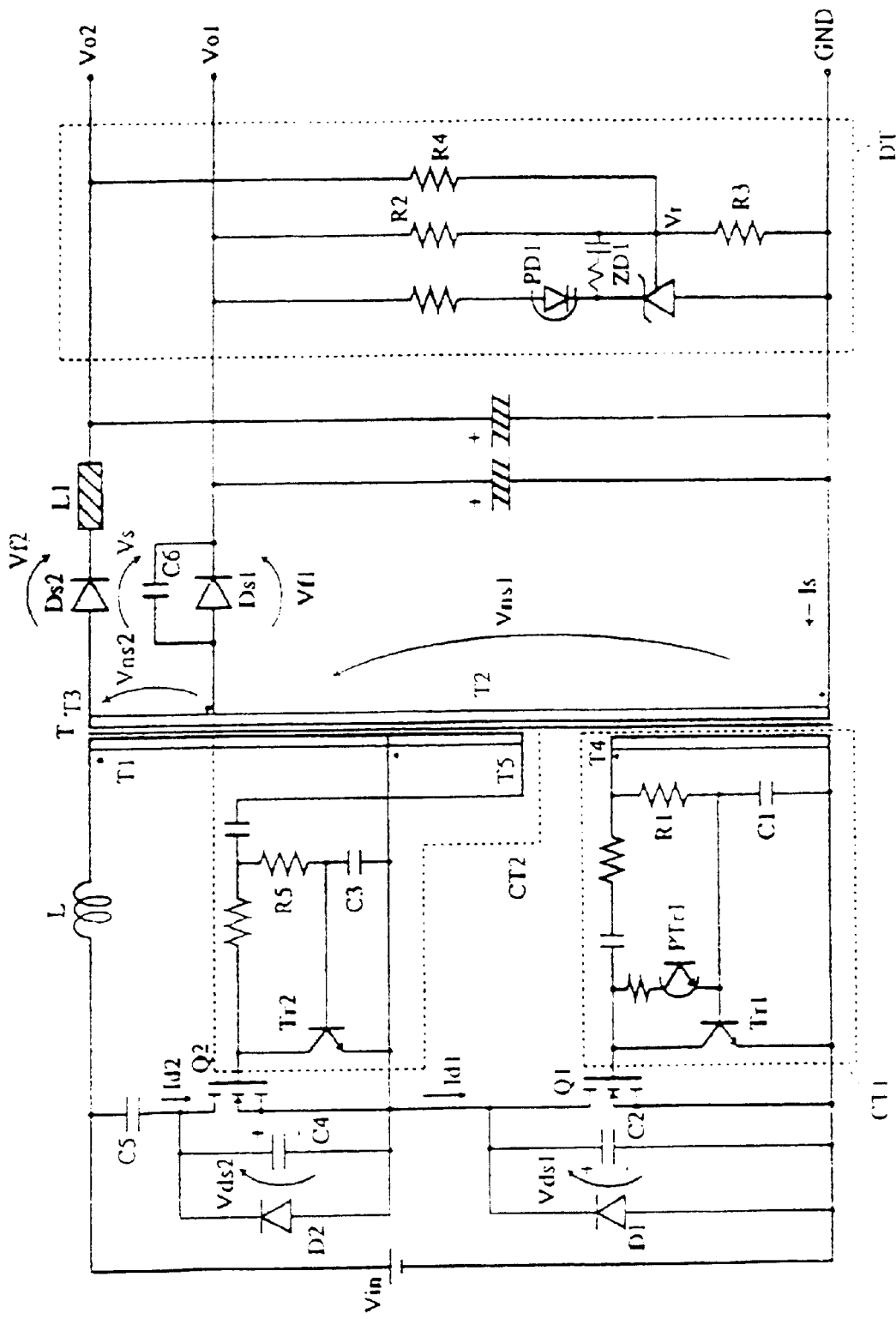
FIG. 2 is a circuit diagram of a switching power supply apparatus according to a first embodiment of the present invention.

FIG. 2 is a circuit diagram of a switching power supply apparatus as an embodiment of the present invention.

This switching power supply apparatus can externally output two output voltages Vo1 and Vo2, and is provided with the secondary winding T2 for outputting the voltage Vo1 and the secondary winding T3 for outputting the voltage Vo2. The secondary winding T3 is a winding continuous with the secondary winding T2. Similarly to the switching power supply apparatus shown FIG. 1, a rectification diode Ds1 is connected to a secondary winding T2, and a rectification diode Ds2 is connected to secondary winding T3. Moreover, in this switching power supply apparatus, a capacitor C6 as a capacitive impedance is connected in parallel to the rectification diode Ds1, and a ferrite bead or beads L1 as an inductive impedance is connected in series with the rectification diode Ds2.

In an output voltage detection circuit DT, a series circuit comprising a photodiode PD1 and a shunt regulator ZD1 as a control signal formation section is connected between an output terminal for outputting the first output voltage Vo1 and GND. A resistor R2 is connected between the voltage comparison terminal (reference input terminal) Vr of the shunt regulator ZD1 in the control signal formation section and the output terrninal of the first output voltage Vo1, and a resistor R4 is connected between Vr and the output terminal of the first output voltage Vo1. Moreover, a resistor R3 is connected between Vr and GND. These resistors R2 and R4 are detection resistors as a means for voltage-detection.

In this switching power supply apparatus, a first switching element Q1 and a second switching element Q2 are connected to the primary of the transformer T.

Figure 1:
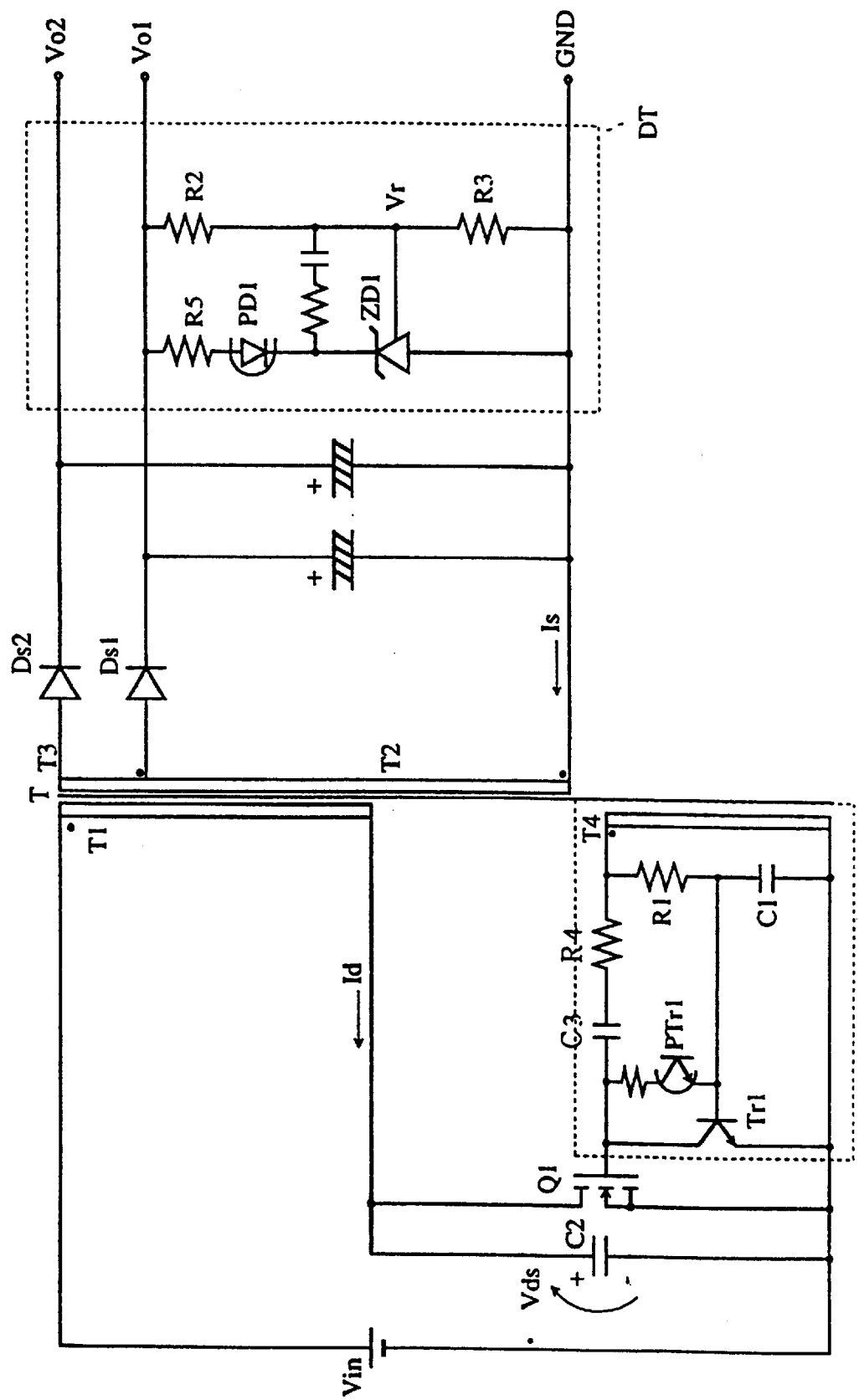
FIG. 1 is a circuit diagram of a conventional switching power supply apparatus.

The configurations of the first switching element Q1 and a control circuit CT1 are similar to those of the conventional switching power supply apparatus of FIG. 1. A diode D1 is connected in parallel with the first switching element Q1. A parasitic diode of the first switching element Q1 may be used instead of the diode D1. In this switching power supply apparatus, the first switching element Q1 comprises a field-effect transistor (MOSFET), and therefore, it has a parasitic diode between the source and the drain. Similarly, the parasitic capacitance of the first switching element Q1 may be used instead of the capacitor C2.

An inductor L is connected in series with a primary winding T1 of the transformer T. Moreover, a capacitor C5 is connected in series with the second switching element Q2. The series circuit comprising the capacitor C5 and the second switching element Q2 is connected in parallel to the series circuit comprising the inductor L and the primary winding T1. In the switching power supply apparatus, as the inductor L, the leakage inductance of the transformer T is preferably employed.

A control circuit CT2 is connected to the control terminal of the second switching element Q2. Similarly to the first control circuit CT1, the control circuit CT2 comprises a drive winding T5 provided in the transformer T, a capacitor and a resistor for delaying the output voltage from the drive winding T5, and applying the voltage to the control terminal of the second switching element Q2, a transistor Tr2 connected to the control terminal of the second switching element Q2, and an RC time constant circuit comprising a resistor R5 connected to the base of the transistor Tr2 and a capacitor C3. A diode D2 and a capacitor C4 are connected in parallel to the second switching element Q2, respectively. Regarding the diode and the capacitor, the parasitic diode and the parasitic capacitance of the second switching element Q2 may be employed instead of discrete components.

Next, the operation will be described.

First, the operation of the output voltage detection circuit DT will be described.

The output voltage detection circuit DT detects the first output voltage Vo1 and the second output voltage Vo2 by means of the resistor R2 and the resistor R4. Here, the control ratio of the output voltage Vo1:Vo2, using the reference voltage Vr at the voltage comparison terminal Vr, is expressed as follows.

$$(Vo1-Vr)/R2:(Vo2-Vr)/R4$$

The above formula represents the current ratio. The higher the current ratio of the left term is, the higher the control ratio of Vo1 becomes. The larger the current strength of the right term is, the higher the control ratio of Vo2 becomes. The output having a higher control ratio is stabilized more highly.

Accordingly, the control ratio a of the output voltage Vo1 is:

$$a=\{(Vo1-Vr)/R2\}$$
$$/\{(Vo1-Vr)/R2+(Vo2-Vr)/R4\}$$

Since the reference input impedance of the shunt regulator is infinite, the above formula is:

$$(Vo1-Vr)/R2+(Vo2-Vr)/R4=Vr/R3.$$

Thus, the following can be obtained:

$$a=(Vo1-Vr)R3/(VrR2)$$

As seen in the above formula, if the voltage accuracy of the first output voltage Vo1 is desired to be enhanced, e.g., the resistance R2 may be decreased so that the control ratio a of the first output voltage Vo1 is increased.

Variations in output voltages Vo1 and Vo2 are reflected by the current of the photodiode PD1 according to the above control ratio. This results in change of the on-off timing of the phototransistor PTr1 in the control circuit CT1, which controls the on-time of the first switching element Q1. Accordingly, whether the output voltage Vo1 or Vo2 is changed, the change amount is fed back to the primary, so that the on-time of the first switching element Q1 is controlled. Owing to this operation, the voltage stability can be more enhanced at a predetermined control ratio whichever output voltages are varied, as compared with the switching power supply apparatus shown in FIG. 1, in which the output voltage Vo2 is not controlled.

Next, the operation of the primary of the transformer T will be described.

When the first switching element Q1 turns on, input voltage Vin is applied to the primary winding T1, causing current to flow so that energy is stored in the transformer T. When the first switching element Q1 turns off, the voltage of the primary winding T1 of the transformer T is inverted. In the primary, the inductor L and the capacitor C5 start to resonate, and in the secondary, the energy stored in the transformer T is released as current via the secondary windings T2 and T3. The state of the primary at this time will be described in detail below.

When the first switching element Q1 turns off, energy stored in the inductor L is released in the right-side direction as seen in the figure, that is, toward the primary winding T1, the parallel circuit comprising the capacitor C4 (in the case of no capacitor C4 provided, the parasitic capacitance of the second switching element Q2) and the diode D2, and the capacitor C5, as charging current for the capacitor C5. At this time, the energy in the inductor L is absorbed in the capacitor C5. Therefore, no surge is caused by the inductor L. At this time, charging current to the capacitor C5 operates so as to discharge the reverse-charges of the capacitor C4. After the charges in the capacitor C4 are discharged, the diode D2 (in the case of the diode D2 not connected, the parasitic diode of the second switching element Q2) conducts. On the other hand, the voltage of the drive winding T5 is delayed by the series circuit comprising the resistor and the capacitor to be applied to the control terminal (gate) of the second switching element Q2. Accordingly, the second switching element Q2 turns off later to some degree than the turning off of the first switching element Q1. Here, the second switching element Q2 is turned off while the diode D2 is in the conduction state. Thus, the turning off is carried out as a zero-voltage switching operation. In this operation, the switching loss of the switching element Q2 can be significantly reduced.

When the second switching element Q2 turns on, discharging current flows, based on the charge potential in the capacitor C5. With this discharging current, energy is stored in the inductor L and the primary winding T1. The discharging current flowing at this time becomes resonant current of the capacitor C5 and the inductor L. The rise of the current is carried out very mildly. As a result, the output currents from the secondary windings T2 and T3 each have a part of a sinusoidal wave-form (mountainous wave-form) which starts from a zero current. Substantially no surge current is generated when the secondary winding current is generated.

By connecting the capacitor C5, the second switching element Q2, and the control circuit CT2 to the primary winding T1 of the transformer T as described above, surge, which is due to the leakage inductance L, can be prevented from occurring in the secondary winding output current and voltage. In addition, the zero voltage switching operation of the second switching element Q2 is realized, so that switching loss can be considerably reduced.

Figure 3:
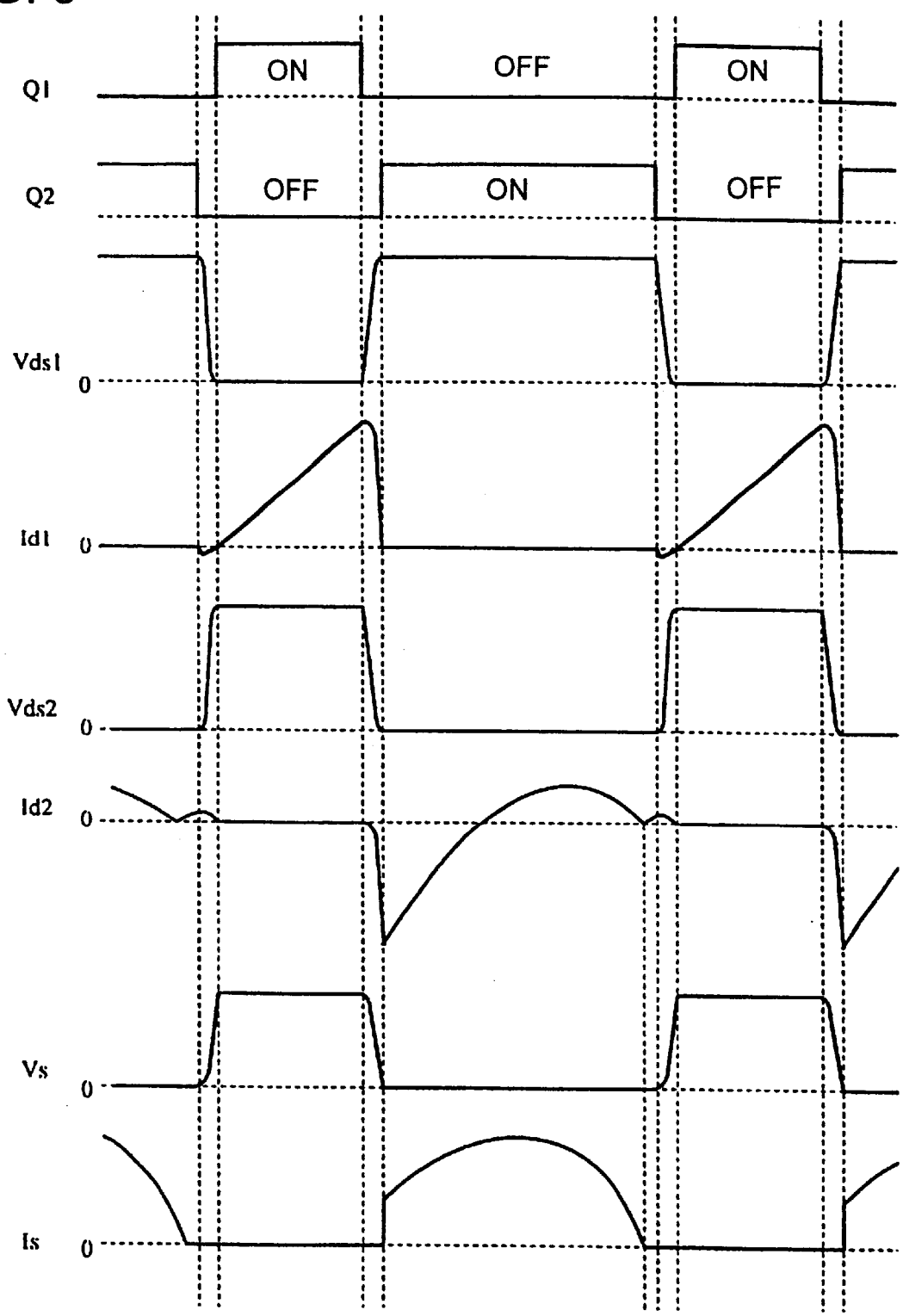
FIG. 3 is an operational waveform chart of the switching power supply apparatus.

When a predetermined time-period, determined by the RC time constant circuit comprising the resistor R5 and the capacitor C3, has passed after the second switching element Q2 turns on, the transistor Tr2 turns on, and the second switching element Q2 turns off. Then, the energy stored in the inductor L and the winding T1 is released as current flowing in the left-side direction as seen in the figure, and flows via the input power source Vin, and the parallel circuit comprising the capacitor C2 (in the case of no capacitor C2 provided, the parasitic capacitance of the first switching element Q1) and the diode D1, and the primary winding T1. This current causes the charges in the capacitor C2 (in the case where no capacitor C2 is connected, the parasitic capacitance of the first switching element Q1) to be discharged. In the state that the discharging has been completed, the voltage across the diode D1 (in the case of no diode D1 provided, the parasitic diode of the first switching element Q1) becomes zero, and the diode D1 starts to conduct. Here, the second switching element Q2 turns off, and thereby, the voltage generated in the drive winding T4 is delayed by the series circuit comprising the resistor R and the capacitor C, and is applied to the control terminal of the (gate terminal) of the first switching element Q1. In this timing, as described above, the voltage across the rectification diode D1 is zero, and therefore, the first switching element Q1 switches at zero voltage. When the first switching element Q1 turns on in the zero-voltage switching-operation, energy starts to be stored in the inductor L and the primary winding T1. FIG. 3 is an operation waveform chart of the circuit of FIG. 2. In the figure, Vds1 represents the source-drain voltage of the first switching element Q1, Vds2 the source-drain voltage of the second switching element Q2, Id1 a current flowing into the first switching element Q1, Id2 a current flowing into the second switching element Q2, Is a secondary winding current, Vs, Vf1 and Vf2 voltages across the rectification diodes Ds1 and across Ds2, respectively (In FIG. 2, as Vs, Vf1 and Vf2 are employed).

According to the above-described operation, the first switching element Q1 and the second switching element Q2 turn on and off alternately, so as to sandwich a time-period when both of them are off. Thus, the switching of these switching elements is a zero-voltage switching operation. The waveform of the secondary winding current shows a part of the sinusoidal waveform (mountainous waveform) which begins from the zero voltage. This enables the switching loss to be significantly reduced, and can prevent the generation of surge.

Next, the operation of the secondary circuit will be described.

The output currents from the secondary windings T2 and T3 are rectified by the rectification diodes Ds1 and Ds2, smoothed by the electrolytic capacitors each connected between the cathodes thereof and GND, and output as the first output voltage Vo1 and the second output voltage Vo2, respectively. In the circuit shown in FIG. 2, the capacitor C6 is connected in parallel to the rectification diode Ds1. The ferrite bead or beads L1 is connected in series with the rectification diode Ds2.

The capacitor C6 relaxes surge produced when voltage is generated across the rectification diode Ds1. The rectification diode Ds2 absorbs current surge occurring when the secondary winding current starts to flow from the secondary winding T3. Accordingly, in this circuit, most of the surge can be absorbed by the circuit arrangement on the primary side of the transformer T. Surge, further generated, can be removed by the capacitor 6 and the ferrite bead or beads L1. The capacitor C6 may be connected to the rectification diode Ds2. Further, the ferrite beads L1 may be connected to the rectification diode Ds2. As regards the selection of whether the capacitor C6 and the ferrite bead or beads L1 should be provided on either or both sides, it may be appropriately carried out, corresponding to the properties of charges and so forth. In this circuit, the number of the secondary windings is two, that is, T2 and T3 are used to produce outputs Vo1 and Vo2, respectively. The number of taps of the secondary winding may be increased to obtain at least three outputs. In this case, detection resistors as voltage detectors for detecting the outputs, respectively, may be connected between the outputs and the voltage comparison terminals Vr.

As in the switching power supply apparatus shown in FIG. 2, the arrangement in which two switching elements are connected to the primary of the transformer T is effective especially in enhancement of the voltage-accuracies of plural output voltages.

Figure 4:
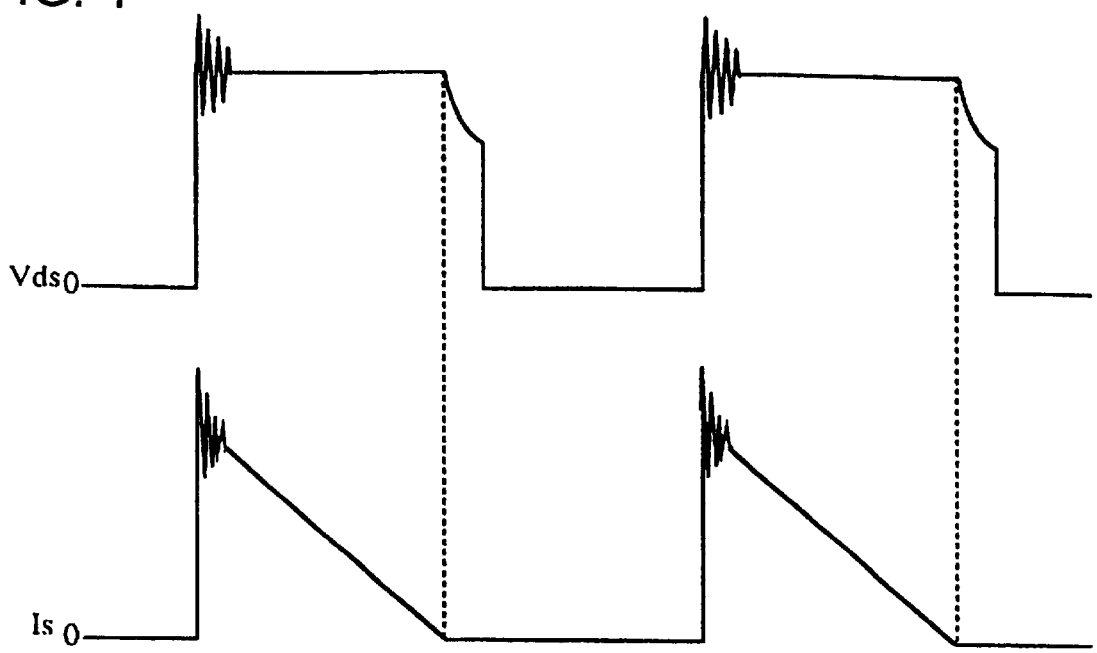
FIG. 4 is an operational waveform chart of the conventional switching power supply apparatus .

For example, in the case in which, for the primary circuit of the transformer T, the conventional arrangement shown in FIG. 1 is employed, the voltage Vds across the first switching element Q1 and the secondary winding current Is surge at the leading edge as shown in FIG. 4. This causes deterioration of the voltage accuracies. One of the main factors for the surge is the leakage inductance L of the transformer T. However, according to the arrangement shown in FIG. 2, the leakage inductance L is incorporated into the operation of the primary circuit of the transformer T as described above. This can eliminate hazardous affects of the leakage inductance L on the output. Thus, in the switching power supply apparatus having the circuit shown in FIG. 2, the control accuracies of two output voltages can be improved by the output voltage detection circuit DT, and moreover, the control accuracies can be enhanced by the circuit arrangement of the primary of the transformer T.

Figure 5:
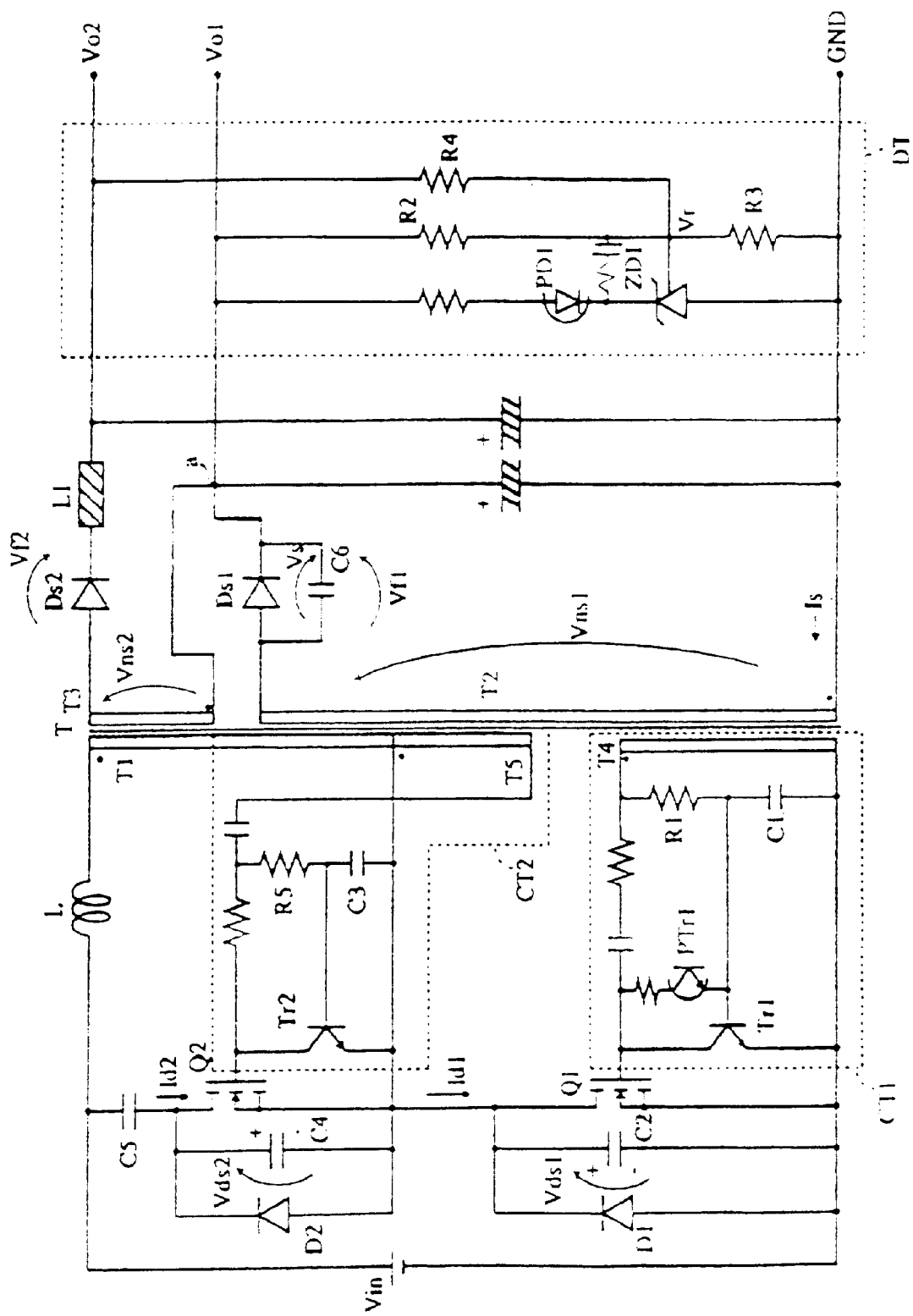
FIG. 5 is a circuit diagram of a switching power supply apparatus according to a second embodiment of the present invention.

FIG. 5 is a circuit diagram of a switching power supply apparatus according to a second embodiment of the present invention.

In this switching power supply apparatus, the secondary windings T2 and T3 are separated. The rectification output terminal point a of the secondary winding T2 is connected to one end of the secondary winding T3. With this arrangement, the voltage at the point a is stabilized. Accordingly, by supplying the stabilized voltage to the secondary winding T3, the voltage accuracy of the second output voltage Vo2 can be further improved.

That is, regarding the circuit shown in FIG. 2, the output is expressed by the following formula in which effects of the ferrite beads L1 are neglected, $$Vo2=Vo1+Vf1+Vns2-Vf2$$

The circuit shown in FIG. 5 is:

$$Vo2=Vo1+Vns2-Vf2$$

As seen in this formula, the circuit shown in FIG. 5 suffers no effects of variations in voltage, caused by changes in current of the rectification diode Ds1. Thus, the voltage accuracy of the second output voltage Vo2 can be further enhanced.

Figure 6:
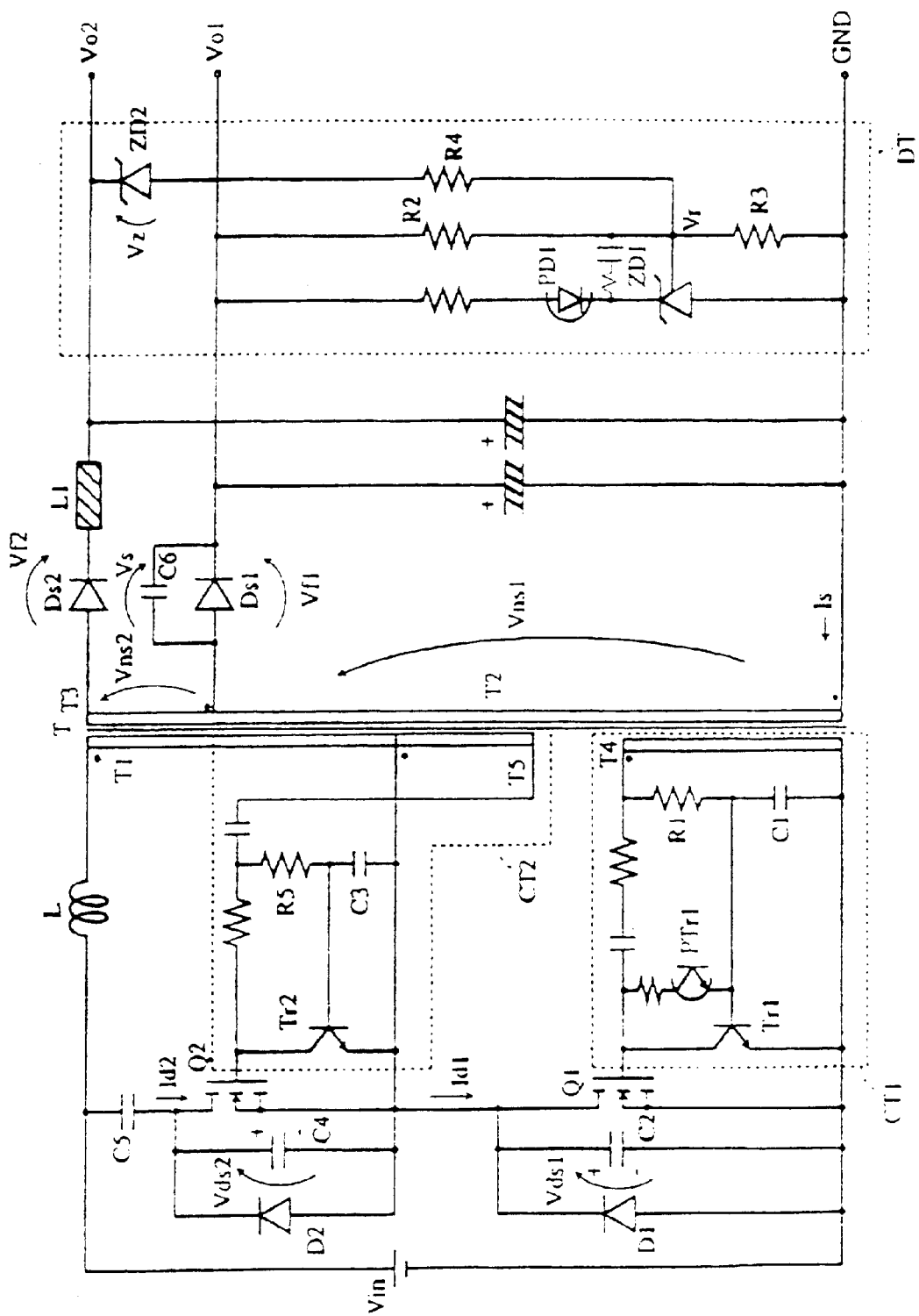
FIG. 6 is a circuit diagram of a switching power supply apparatus according to a third embodiment of the present invention.

FIG. 6 is a circuit diagram of a switching power supply apparatus according to anther embodiment of the present invention.

In this switching power supply apparatus, a Zener diode ZD 2 is connected in series with the resistor R4. With this arrangement, only when the output voltage Vo2 is increased to exceed the Zener voltage Vz, the control ratio a of the second output voltage Vo2 is:

$$a=(Vo1-Vz-Vr)R3/(VrR4)$$

By appropriate selection of the Zener voltage Vz, the output stabilization control can be carried out at the above-described control ratio a to prevent the output voltage from rising, only when the second output voltage Vo2 exceeds a predetermined voltage (Zener voltage). Moreover, when the output voltage Vo2 is lower than the predetermined voltage (Zener voltage), only the first output voltage Vo1 is controlled for stabilization.

Figure 7:
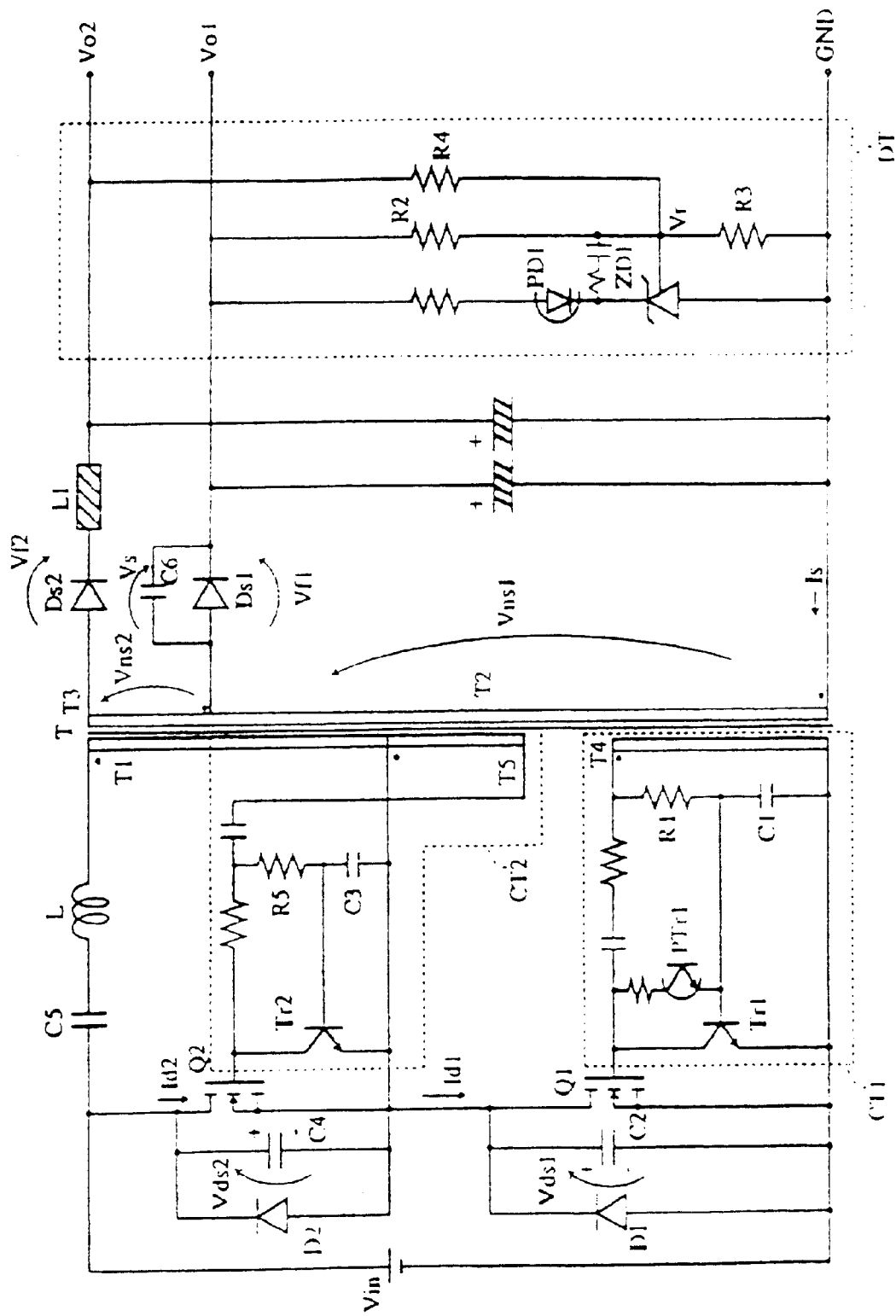
FIG. 7 shows a modification of the above-described first embodiment.
Figure 8:
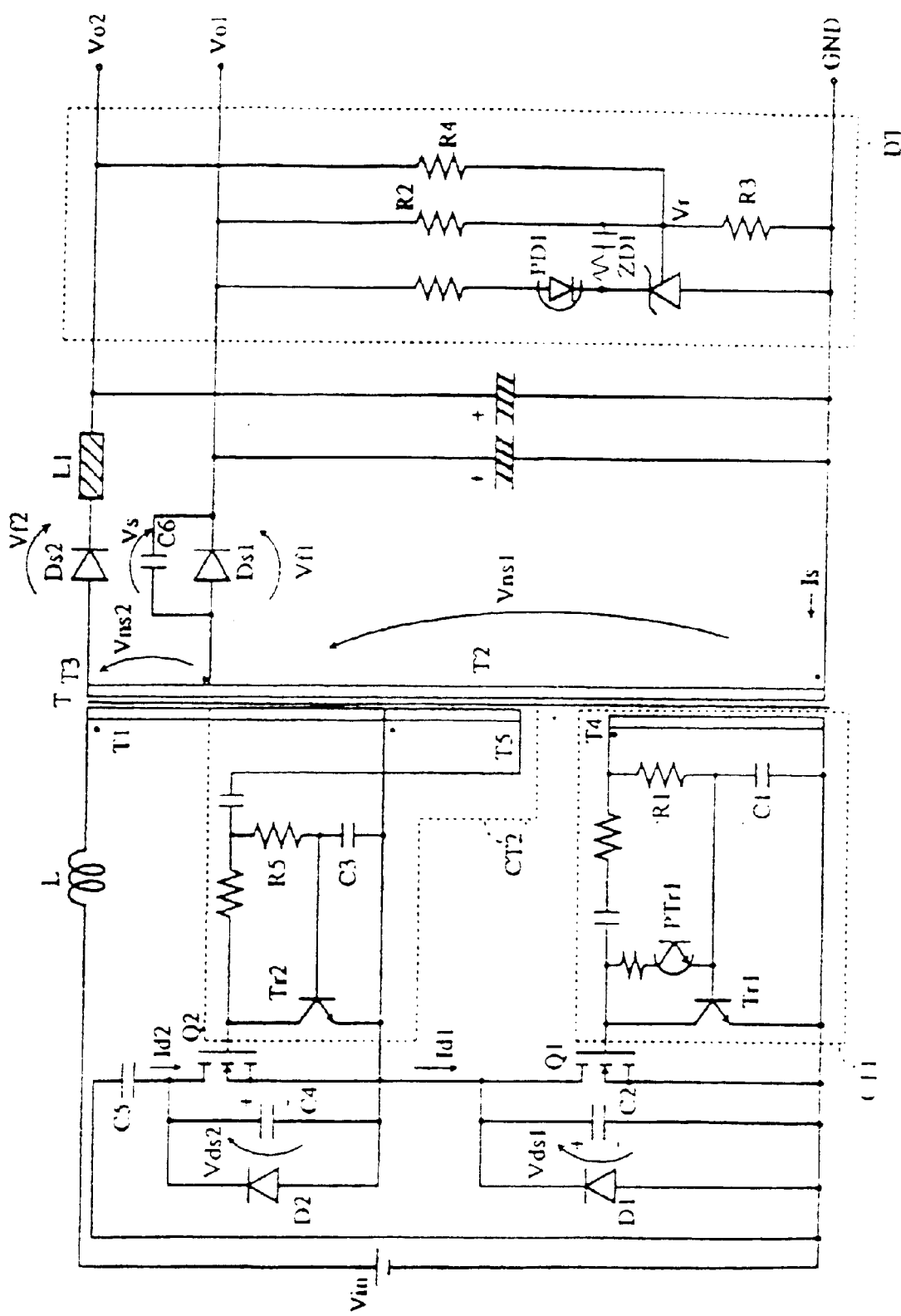
FIG. 8 shows another modification of the first embodiment.

FIGS. 7 and 8 show modifications of the switching power supply apparatus of FIG. 2. That is, in FIG. 7, a capacitor C5 is connected in series with the inductor L. The series circuit comprising the capacitor C5, the inductor L, and the primary winding TI is connected in parallel to the second switching element Q2.

Moreover, in FIG. 8, the inductor L is connected in series with the primary winding T1. The series circuit comprising the capacitor C5 and the second switching element Q2 is connected in parallel to the first switching element Q1.

Also, in these modifications, the switching operation is the same as the above-described operation shown in FIG. 2.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply apparatus comprising a transformer having a primary winding and at least two secondary windings, a first switching element having an on-time and an off-time, the first switching element connected in series with the primary winding, a control circuit for controlling at least two different outputs from the at least two secondary windings by control of the on-time of the first switching element, a rectification circuit for rectifying at least two outputs from the secondary windings and providing at least two output voltages, and an output detection circuit for detecting the at least two output voltages and providing a control signal for control of the on-time to the control circuit, wherein the output voltage detection circuit comprises a control signal formation circuit in which the control signal for control of the on-time is formed, corresponding to a voltage at a voltage comparison terminal, and plural voltage detectors connected between the at least two outputs of the secondary windings and the voltage comparison terminal, respectively, whereby the at least two different outputs from the at least two secondary windings are stabilized in dependence on a predetermined control ratio for the outputs.

2. The switching power supply apparatus of claim 1, wherein the plural voltage detectors comprise at least one Zener diode.

3. The switching power supply apparatus of claim 2, wherein a rectification output terminal of a first one of the secondary windings is connected to one end of a second of the secondary windings, and current is rectified at a second end of said second of the secondary windings and provided as an output voltage.

4. The switching power supply apparatus of claim 1, wherein a rectification output terminal of a first one of the secondary windings is connected to one end of a second of the secondary windings, and current is rectified at a second end of said second of the secondary windings and provided as an output voltage.

5. The switching power supply apparatus of claim 1, wherein when the first switching element is on, input voltage is applied to the primary winding, causing current to flow, so that energy is stored in the transformer, and when the first switching element is off, energy stored in the transformer is released from the secondary windings.

6. The switching power supply apparatus of claim 5, further comprising an inductor connected in series with the primary winding, and a series circuit comprising a capacitor and a second switching element, connected in parallel to a series circuit comprising the inductor and the primary winding,
wherein the control circuit turns the first and second switching elements on and off, alternately, so as to sandwich a time-period when both of the first and second switching elements are off, and controls the on-time of the switching elements, whereby the outputs therefrom are controlled.

7. The switching power supply apparatus of claim 6, wherein the control circuit comprises first and second drive windings provided in the transformer to drive the first and second switching elements, respectively, and a control section provided with first and second time constant circuits for providing on-off signals to control terminals of the first and second switching elements, respectively, at a predetermined timing by use of a voltage substantially proportional to a voltage of the primary winding and generated in the first and second drive windings, whereby the first and second switching elements are autonomously oscillated.

8. The switching power supply apparatus of claim 6, wherein the first and second switching elements are field-effect transistors.

9. The switching power supply apparatus of claim 6, wherein the inductor comprises a leakage inductance of the transformer.

10. The switching power supply apparatus of claim 5, further comprising an inductor connected in series with the primary winding, and a series circuit comprising a capacitor and a second switching element, connected in parallel to the first switching element,
wherein the control circuit turns the first and second switching elements on and off, alternately, so as to sandwich a time-period when both of the first and second switching elements are off, and controls the on-time of the switching elements, whereby the outputs therefrom are controlled.

11. The switching power supply apparatus of claim 10, wherein the inductor comprises a leakage inductance of the transformer.

12. The switching power supply apparatus of claim 10, wherein the first and second switching elements are field-effect transistors.

13. The switching power supply apparatus of claim 10, wherein the control circuit comprises first and second drive windings provided in the transformer to drive the first and second switching elements, respectively, and a control section provided with first and second time constant circuits for providing on-off signals to control terminals of the first and second switching elements, respectively, at a predetermined timing by use of a voltage substantially proportional to a voltage of the primary winding and generated in the first and second drive windings, whereby the first and second switching elements are autonomously oscillated.

14. The switching power supply apparatus of claim 5, further comprising an inductor and a capacitor which are connected in series with the primary winding, and a series circuit which comprises a second switching element connected in parallel to a series circuit comprising the inductor and the primary winding,
wherein the control circuit turns the first and second switching elements on and off, alternately, so as to sandwich a time-period when both of the first and second switching elements are off, and controls the on-time of the switching elements, whereby the outputs therefrom are controlled.

15. The switching power supply apparatus of claim 14, wherein the first and second switching elements are field-effect transistors.

16. The switching power supply apparatus of claim 1, wherein the rectification circuit includes a rectification diode and a capacitive impedance connected in parallel to the rectification diode for at least one of the at least two outputs.

17. The switching power supply apparatus of claim 1, wherein the rectification circuit includes a rectification diode, and an inductive impedance connected in series with the rectification diode for at least one of the at least two outputs.

18. A switching power supply apparatus comprising a transformer having a primary winding and at least two secondary windings, a first switching element having an on-time and an off-time, the first switching element connected in series with the primary winding, a control circuit for controlling at least two different outputs from the at least two secondary windings by control of the on-time of the first switching element, a rectification circuit for rectifying at least two outputs from the secondary windings and providing at least two output voltages, an output voltage detection circuit for detecting the at least two output voltages and providing a control signal for control of the on-time to the control circuit, wherein the output voltage detection circuit comprises a control signal formation circuit in which the control signal for control of the on-time is formed, corresponding to a voltage at a voltage comparison terminal, and plural voltage detectors connected between the at least two outputs of the secondary windings and the voltage comparison terminal, respectively, whereby the at least two different outputs from the at least two secondary windings are stabilized in dependence on a predetermined control ratio for the outputs, and further wherein the at least two secondary windings have a common terminal and further wherein the rectifiction circuit comprises two rectification circuits, one for each output and the common terminal is connected to an input of one of the rectification circuits.

19. A switching power supply apparatus comprising a transformer having a primary winding and at least two secondary windings, a first switching element having an on-time and an off-time, the first switching element connected in series with the primary winding, a control circuit for controlling at least two different outputs from the at least two secondary windings by control of the on-time of the first switching element, a rectification circuit for rectifying at least two outputs from the secondary windings and providing at least two output voltages, and an output voltage detection circuit for detecting the at least two output voltages and providing a control signal for control of the on-time to the control circuit, wherein the output voltage detection circuit comprises a control signal formation circuit in which the control signal for control of the on-time is formed, corresponding to a voltage at a voltage comparison terminal and plural voltage detectors connected between the at least two outputs of the secondary windings and the voltage comparison terminal, respectively, whereby the at least two different outputs from the at least two secondary windings are stabilized in dependence on a predetermined control ratio for the outputs, and further wherein the at least two secondary windings are electrically isolated from each other, the rectification circuit comprising first and second rectification circuits, the first rectification circuit providing an output from a first of the secondaries and the second rectification circuit providing an output from a second of the secondaries, and wherein a second terminal of the first secondary is coupled to an output of the second rectification circuit for the second secondary.

20. A switching power supply apparatus comprising a transformer having a primary winding and at least two secondary windings, a first switching element having an on-time and an off-time, the first switching element connected in series with the primary winding, a control circuit for controlling at least two different outputs from the at least two secondary windings by control of the on-time of the first switching element, a rectification circuit for rectifying at least two outputs from the secondary windings and providing at least two output voltages, and an output voltage detection circuit for detecting the at least two output voltages and providing a control signal for control of the on-time to the control circuit wherein the output voltage detection circuit comprises a control signal formation circuit in which the control signal for control of the on-time is formed, corresponding to a voltage at a voltage comparison terminal, and plural voltage detectors connected between the at least two outputs of the secondary windings and the voltage comparison terminal, respectively, whereby the at least two different outputs from the at least two secondary windings are stabilized in dependence on a predetermined control ratio for the outputs and further comprising a volatage avalanche device provided in one of the plural voltage detectors connected between one of the outputs of the secondary windings and the voltage comparison terminal whereby output stabilization is controlled by the predetermined control ratio so as to prevent the output voltage from rising only when one of the output voltages exceeds a predetermined voltage.

* * * * *